(12) United States Patent
Toyoda

(10) Patent No.: US 11,351,624 B2
(45) Date of Patent: *Jun. 7, 2022

(54) METHOD FOR JOINING DISSIMTILAR METAL PLATES

(71) Applicant: TOYOTA JIDOSHA KABUSHIKI KAISHA, Toyota (JP)

(72) Inventor: Akihiro Toyoda, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 182 days.

This patent is subject to a terminal disclaimer.

(21) Appl. No.: 16/255,217

(22) Filed: Jan. 23, 2019

(65) Prior Publication Data

US 2019/0224775 A1  Jul. 25, 2019

(30) Foreign Application Priority Data

Jan. 24, 2018 (JP) .............................. JP2018-010039

(51) Int. Cl.
  *B23K 11/11* (2006.01)
  *B23K 11/18* (2006.01)
  *B23K 103/10* (2006.01)

(52) U.S. Cl.
  CPC ............. *B23K 11/115* (2013.01); *B23K 11/11* (2013.01); *B23K 11/185* (2013.01); *B23K 2103/10* (2018.08)

(58) Field of Classification Search
  CPC ....... B23K 11/11; B23K 11/115; B23K 11/20; B23K 11/16; B23K 11/163; B23K 11/185;

(Continued)

(56) References Cited

U.S. PATENT DOCUMENTS

| 3,666,913 A | 5/1972 | Haefling et al. |
| 3,860,778 A * | 1/1975 | Rudd ..................... B23K 13/00 219/67 |

(Continued)

FOREIGN PATENT DOCUMENTS

| CN | 101043968 A | 9/2007 |
| CN | 103753005 A | 4/2014 |

(Continued)

OTHER PUBLICATIONS

"Welding Technology and Engineering Professional Experimental Course/Chen Yuhua, Sun Guodong Wang", Beijing: Aviation Industry Press, Sep. 2016, pp. 301-302 (11 pages total).

(Continued)

*Primary Examiner* — John J Norton
*Assistant Examiner* — Simpson A Chen
(74) *Attorney, Agent, or Firm* — Sughrue Mion, PLLC

(57) ABSTRACT

Provided is a method for joining two dissimilar metal plates having different volume resistivity to increase joint strength of the metal plates. The method includes: overlapping a first metal plate including a first metal and a second metal plate including a second metal, the second metal having volume resistivity higher than the first metal and being different from the first metal, and bringing a pair of electrodes into contact with a surface of an overlapped portion of the first metal plate that is overlapped with the second metal plate; and applying current between the electrodes so as to melt the first metal present at a current-flowing region of the overlapped portion due to heat generated by resistance to form an intermetallic compound of the first and the second metals between the first and the second metal plates and join the first and the second metal plates via the intermetallic compound.

5 Claims, 5 Drawing Sheets

(58) Field of Classification Search
 CPC ............ B23K 11/3009; B23K 2103/10; B23K 2103/04
 See application file for complete search history.

(56) References Cited

U.S. PATENT DOCUMENTS

| | | | |
|---|---|---|---|
| 6,459,064 B1* | 10/2002 | Trubert | B23K 11/00 219/85.1 |
| 10,518,482 B2 | 12/2019 | Iwamoto et al. | |
| 2007/0212565 A1 | 9/2007 | Urushihara et al. | |
| 2009/0050608 A1 | 2/2009 | Hayashi et al. | |
| 2011/0097594 A1 | 4/2011 | Tanaka et al. | |
| 2013/0056451 A1* | 3/2013 | Hasegawa | B23K 11/11 219/127 |
| 2015/0053655 A1 | 2/2015 | Sigler et al. | |
| 2017/0106466 A1* | 4/2017 | Sigler | B23K 11/185 |
| 2017/0297136 A1 | 10/2017 | Brown et al. | |
| 2019/0247949 A1* | 8/2019 | Toyoda | B29C 66/81811 |
| 2019/0283162 A1 | 9/2019 | Shi et al. | |

FOREIGN PATENT DOCUMENTS

| | | |
|---|---|---|
| CN | 105269137 A | 1/2016 |
| CN | 107297564 A | 10/2017 |
| CN | 107398627 A | 11/2017 |
| JP | 2861819 B2 | 2/1999 |
| JP | 2003-019569 A | 1/2003 |
| JP | 2005-144500 A | 6/2005 |
| JP | 2008-73728 A | 4/2008 |
| JP | 4519508 B2 | 8/2010 |
| JP | 4905766 B2 | 3/2012 |
| JP | 4941876 B2 | 5/2012 |
| JP | 2012-152786 A | 8/2012 |
| JP | 2012-179630 A | 9/2012 |
| JP | 2013-31858 A | 2/2013 |
| JP | 2013031858 A * | 2/2013 |
| JP | 5315207 B2 | 10/2013 |
| JP | 5468350 B2 | 4/2014 |
| JP | 5624901 B2 | 11/2014 |
| JP | 2015-093283 A | 5/2015 |
| JP | 6068147 B2 | 1/2017 |
| JP | 2017-70174 A | 4/2017 |

OTHER PUBLICATIONS

Communication dated Dec. 9, 2020 by the United States Patent and Trademark Office in U.S. Appl. No. 16/271,156.
U.S. Appl. No. 16/271,156, filed Feb. 8, 2019.
Yoshisada Ueda et al., "On the Alloy Layers Formed by the Reaction between Ferrous Alloys and Molten Aluminium", Journal of Japan Metallurgy, 1978, vol. 42, No. 6, pp. 543-549, Retrieved from URL:<https://www.jstage.jst.go.jp/article/jinstmet1952/42/6/42_6_543/_article/-char/ja> (7 pages).
Final Office Action dated Apr. 27, 2021 by the United States Patent and Trademark Office in U.S. Appl. No. 16/271,156.
Bergmann et al., "Einfluss intermetallischer Phasen auf die Langzeitstabilität von ultraschallgeschweiBten Kupfer-Aluminium-Kontakten", Metall-Forschung, 67th edition, Nov. 2013, pp. 504-507 (5 pages total).
Dobrinski et al., "Physik fur Ingenieure", B. G.Teubner Stuttgart, 5th edition, 1980, p. 218, (6 pages total).
Non-Final Office Action dated Sep. 8, 2021 from the United States Patent and Trademark Office in U.S. Appl. No. 16/271,156.
Notice of Allowance dated Feb. 11, 2022 in related U.S. Appl. No. 16/271,156.

* cited by examiner

METHOD FOR JOINING DISSIMTILAR METAL PLATES

CROSS REFERENCE TO RELATED APPLICATIONS

The present application claims priority from Japanese patent application JP 2018-010039 filed on Jan. 24, 2018, the content of which is hereby incorporated by reference into this application.

BACKGROUND

Technical Field

The present disclosure relates to a method for joining two dissimilar metal plates that are different in volume resistivity.

Background Art

Conventionally spot welding has been performed to join an aluminum alloy plate and a steel plate. JP 2012-152786 A, for example, proposes this type of spot welding to join dissimilar metal plates. This method overlaps an aluminum alloy plate and a steel plate and sandwiches the overlapped part between a pair of electrodes, followed by pressurizing. The method then performs resistance spot welding of the pressurized overlapped part by applying current between the electrodes. According to this joining method, when current is applied between the electrodes, a current-flowing part of the aluminum alloy plate and the steel plate generates heat due to their electrical resistance and melt, whereby these metal parts are joined at the part.

SUMMARY

When the method of JP 2012-152786 A joins dissimilar metal plates, such as an aluminum alloy plate and a steel plate, one of the metal plates having lower volume resistivity than that of the other metal plate generates less heat than in the other plate during the application of current. The method therefore has to apply current higher than the current required to melt one of the metal plates.

In this way, to join these dissimilar metal plates, the method has to apply current higher than the current required to melt one of the metal plates having higher volume resistivity so as to melt the other metal plate. This causes excessive current to flow through the one of the metal plates. As a result, the one of the metal plates having the excessive current flowing therethrough may generate a void, for example, at the melting part due to the current, and so the joint strength between the dissimilar metal plates may not be sufficient.

In view of the above problem, the present disclosure provides a method for joining dissimilar metal plates that are different in volume resistivity, and the method can increase the joint strength of the two metal plates.

In view of the above problem, a method for joining dissimilar metal plates according to the present disclosure, includes the steps of: overlapping a first metal plate including a first metal and a second metal plate including a second metal as the dissimilar metal plates, the second metal having volume resistivity higher than volume resistivity of the first metal and being different from the first metal, and bringing a pair of electrodes into contact with a surface of an overlapped portion of the first metal plate that is overlapped with the second metal plate; and applying current between the pair of electrodes so as to melt the first metal present at a current-flowing region of the overlapped portion due to heat generated by resistance so as to form an intermetallic compound of the first metal and the second metal between the first metal plate and the second metal plate and join the first metal plate and the second metal plate via the intermetallic compound.

For the purposes of the present disclosure, "a first metal plate including a first metal" includes the first metal plate made of the first metal only and a metal plating film formed on the plate-like base material made of the first metal only, and the first metal plate includes the first metal as the major material. Similarly for the purposes of the present disclosure, "a second metal plate including a second metal" includes the second metal plate made of the second metal only and a metal plating film formed on the plate-like base material made of the second metal only, and the second metal plate includes the second metal as the major material. For the purposes of the present disclosure, "a first metal and a second metal" may be metal made up of the metallic element only or an alloy including another metal added.

The present disclosure brings a pair of electrodes into contact with the surface of the first metal plate at a part that is overlapped with the second metal plate, and applies current between these electrodes. The first metal for the first metal plate has volume resistivity lower than the volume resistivity of the second metal for the second metal plate, and so current applied hardly flows through a part between the first metal plate and the second metal plate and in the second metal plate. Instead, current flows through the current-flowing region in the first metal plate corresponding to a part between the electrodes. As a result, the first metal melts due to heat generated by resistance, and the second metal of the second metal plate in contact with the melting part diffuses into the first metal. Thereby an intermetallic compound made of the first metal and the second metal is formed between the first metal plate and the second metal plate. Especially when the second metal has a melting point higher than the melting point of the first metal, the second metal (second metal plate) does not melt, and diffuses into the melting part of the first metal, so that the intermetallic compound as stated above is formed there. As a result, this intermetallic compound serves as a joining member to join the first metal plate and the second metal plate. In addition, impurities or the like at the surface of the second metal plate are allowed to diffuse into a melting part of the melted first metal.

In this way, the method of the present disclosure does not require excessive current applied to the second metal plate having volume resistivity higher than that of the first metal plate as in the conventional joining method. Instead, current necessary to melt the first metal plate may be applied to the first metal plate so as to melt the first metal. The method therefore hardly generates a void due to excessive heating at the second metal plate and the joint part. When the joint part at a high temperature due to excessive heating is cooled, the structure at the joint part easily becomes coarse. The method of the present disclosure can suppress such excessive heating, and so can prevent the structure at the joint part from becoming coarse and can keep enough strength at the joint part.

When the current applied between the electrodes can join the first metal plate and the second metal plate sufficiently, the first and the second metal plates may not be pressurized. In some embodiments, at the step of bringing the pair of electrodes in contact, a pressurizing member including a non-conductive material is disposed between the pair of electrodes, and at the step of joining the first and the second metal plates, current is applied between the pair of electrodes while pressurizing the first metal plate against the second metal plate with the pressurizing member disposed between the pair of electrodes.

This embodiment applies current to the pair of electrodes while pressurizing the first metal plate against the second metal plate with the pressurizing member disposed between the pair of electrodes. The pressurizing member then can push out the redundant intermetallic compound generated between the first metal plate and the second metal plate to the surrounding. This can reduce the redundant intermetallic compound at the joint part and can keep the thickness of the intermetallic compound thin. The strength of the joint part therefore can improve.

As long as the second metal has volume resistivity higher than the volume resistivity of the first metal, the first and the second metals are not limited especially. In some embodiments, the first metal plate is an aluminum plate or an aluminum alloy plate and the second metal plate is a steel plate. Although it is difficult to join these dissimilar metal plates with sufficient joint strength, the joining method as stated above can join the metal plates favorably. While aluminum or aluminum alloy as the first metal has a melting point at about 600° C., steel as the second metal plate has a melting point at about 1500° C. That is, although aluminum or aluminum alloy melts due to heat generated by resistance, steel (steel plate) of the second metal plate adjacent to the first metal plate does not melt by the heat of melting. Iron or the like of the steel plate (solid phase) of the second metal plate, however, diffuses into the melting part (liquid-phase part) of aluminum or aluminum alloy of the first metal plate. As a result, an intermetallic compound at least including aluminum and iron is formed between the first metal plate and the second metal plate. Examples in the present disclosure described later clearly show this.

The present disclosure can increase the joint strength of two dissimilar metal plates made of different metal materials.

DETAILED DESCRIPTION

The following describes a method for joining dissimilar metal plates according to one embodiment of the present disclosure.

1. Resistance-Welding Apparatus 1

Figure 1:
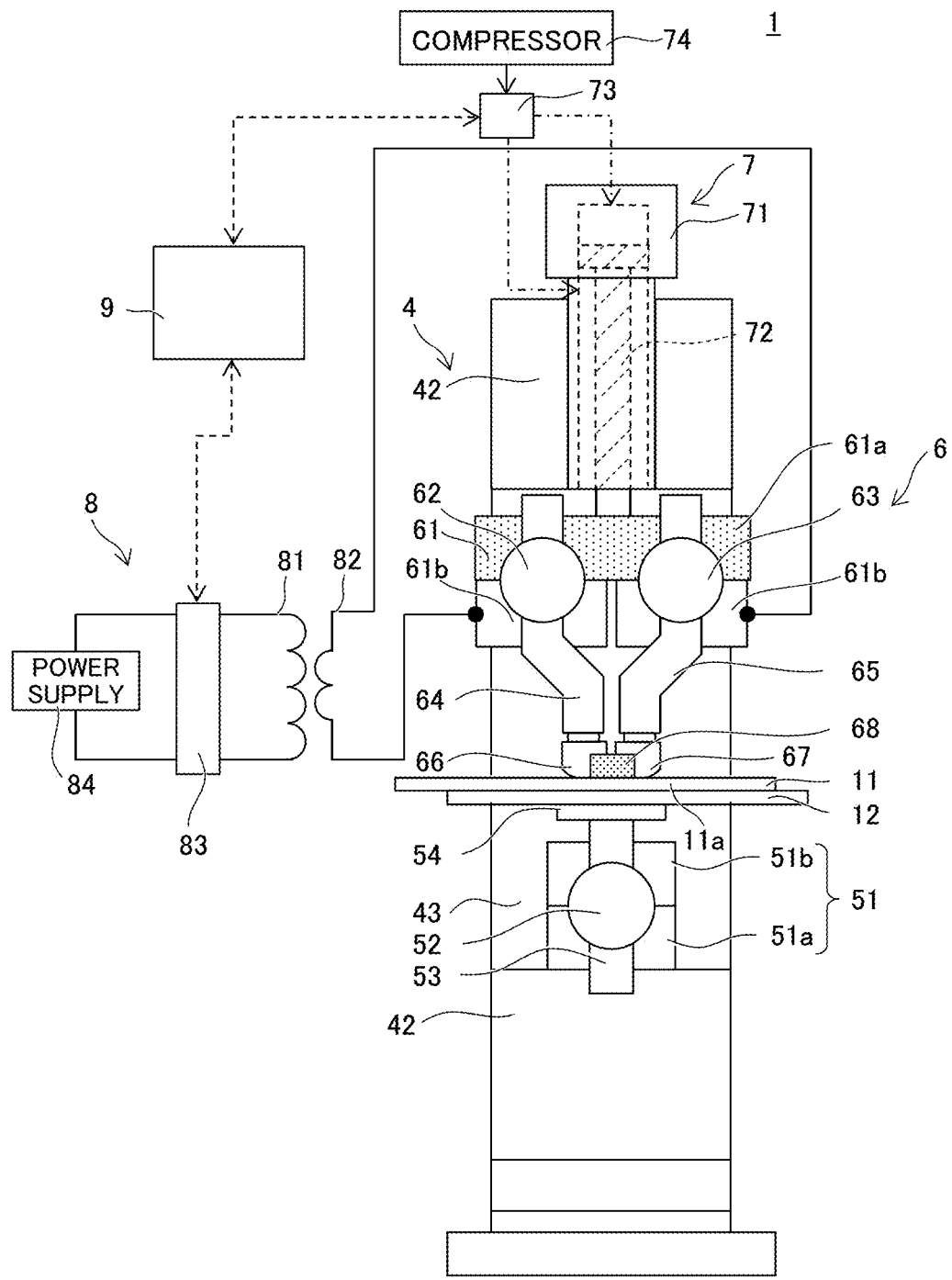
FIG. 1 is a front view of a resistance-welding apparatus according to one embodiment of the present disclosure.
Figure 2:
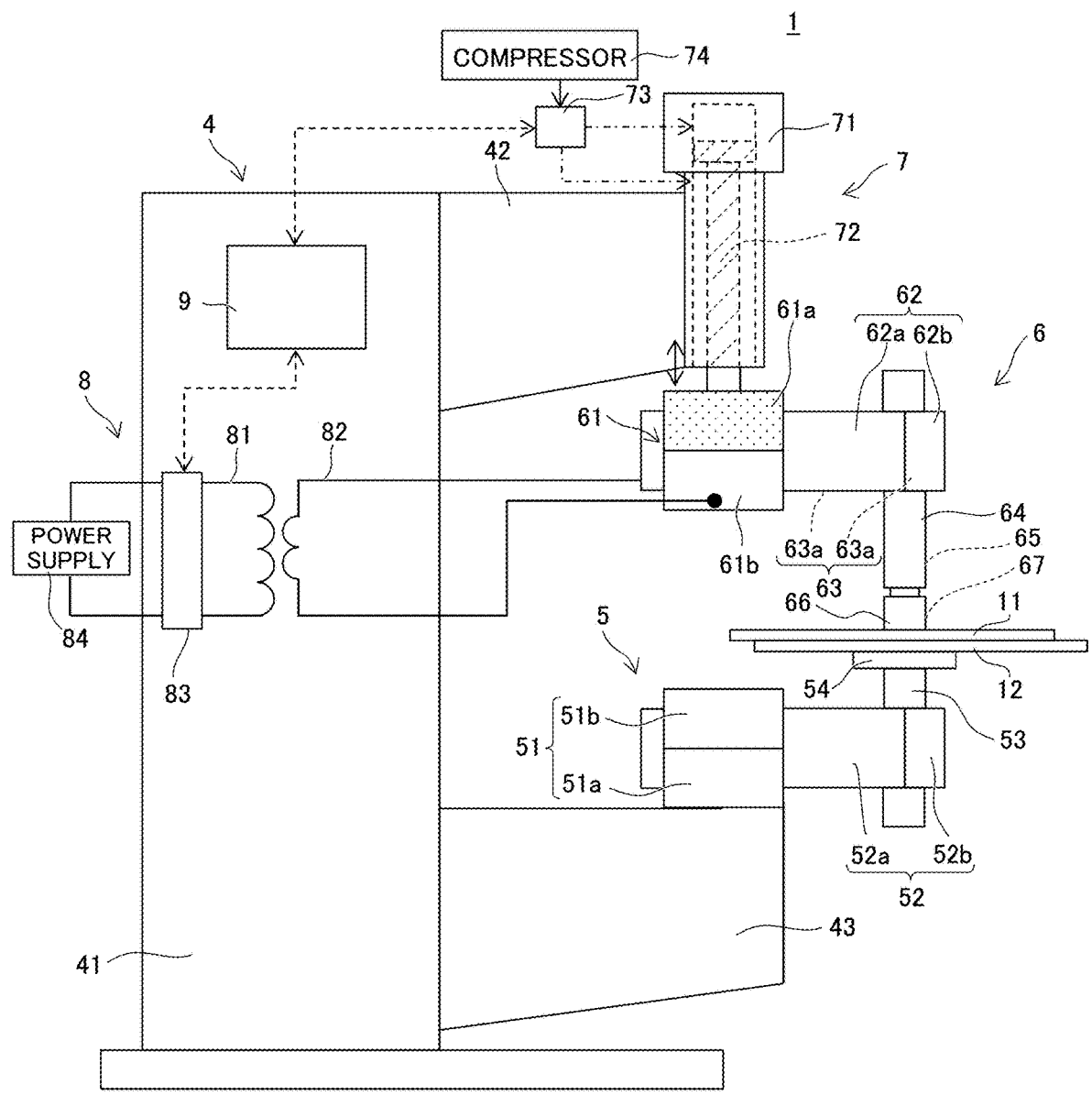
FIG. 2 is a left side view of the resistance-welding apparatus of FIG. 1.

Referring firstly to FIGS. 1 and 2, the following describes a resistance-welding apparatus 1 that is suitable to perform a method for joining dissimilar metal plates according to one embodiment of the present disclosure. FIG. 1 is a front view of the resistance-welding apparatus 1 according to one embodiment of the present disclosure. FIG. 2 is a left side view of the resistance-welding apparatus 1 of FIG. 1.

As shown in FIGS. 1 and 2, the resistance-welding apparatus 1 is to join dissimilar metal plates made of dissimilar metals that are different in volume resistivity by resistance welding. More specifically the resistance-welding apparatus 1 joins a first metal plate 11 made of a first metal and a second metal plate 12 made of a second metal that has higher volume resistivity than that of the first metal plate.

The resistance-welding apparatus 1 includes a body 4, a support 5 that supports the first and the second metal plates 11 and 12, a welding unit 6 that welds the first and the second metal plates 11 and 12, an elevator 7 to move the welding unit 6 up and down, a current supplying unit 8 to supply current to the welding unit 6, and a controller 9 to control the elevator 7 and the current supplying unit 8.

As shown in FIG. 2, the body 4 includes a housing 41, an upper arm 42 extending horizontally from an upper part of the housing 41, and a lower arm 43 opposed to the upper arm 42 and extending horizontally from a lower part of the housing 41. The welding unit 6 is mounted to the upper arm 42 via the elevator 7, and the support 5 is mounted to the lower arm 43.

The support 5 includes a supporting block 51, a first supporting arm 52 and a second supporting arm 53, and a mount base 54. The supporting block 51 includes a pair of upper and lower blocks 51b and 51a, and the lower block 51a is fixed to the lower arm 43. The upper block 51b is attached to the lower block 51a so as to clamp the first supporting arm 52.

The first supporting arm 52 extends horizontally from the supporting block 51, and includes an arm body 52a attached to the supporting block 51, and a fixing member 52b at the distal end of the arm body 52a. The fixing member 52b is attached to the arm body 52a so as to grip the second supporting arm 53. The second supporting arm 53 extends upward from the supporting block 51, and the mount base 54 is attached to the distal end of the second supporting arm 53. The mount base 54 is a base to mount the first metal plate 11 and the second metal plate 12 as workpieces for welding.

The welding unit 6 is attached to the upper arm 42 via the elevator 7. The elevator 7 includes a cylinder 71, a piston 72 that slides inside of the cylinder 71, and a pneumatic circuit (air circuit) 73 to supply predetermined actuating air into the cylinder 71. The pneumatic circuit 73 connects to a compressor 74 to supply compressed air. The pneumatic circuit is controlled by a signal from the controller 9 so as to supply actuating air at a predetermined pressure to any one of the upward-side port and the downward-side port of the piston 72 in the cylinder 71. The elevator 7 may be an electrical pressurizing device having a mechanism configured to directly operate with the rotation of a motor. Such a configuration including an electrical pressurizing device also can join the first and the second metal plates 11 and 12 described later.

In this way, the piston 72 moves up and down, and this can move a pair of electrodes 66 and 67 of the welding unit 6 and a pressurizing member 68, which will be described later, toward the mount base 54 (i.e., toward the first metal plate 11).

The welding unit 6 includes: a holding block 61 attached to the distal end of the cylinder 71; a pair of third supporting arms 62 and 63 extending horizontally from the holding block 61; and a pair of fourth supporting arms 64 and 65 extending downward from the third supporting arms 62 and 63, respectively. The welding unit 6 also includes the pair of electrodes 66 and 67 at the distal end of the four supporting arms 64 and 65 and the pressurizing member 68 disposed between the electrodes.

The holding block 61 is a fixing block 61a and a pair of gripping blocks 61b and 61b. The fixing block 61a is made of a non-conductive material, such as resin or ceramics. Each gripping block 61b connects to a positive electrode or a negative electrode of the current supplying unit 8. Each gripping block 61b is made of a conductive material, e.g., a metal material, such as steel alloy. This conductive material may have volume resistivity lower than that of the first metal of the first metal plate 11 as a workpiece. This can suppress heat generation at the gripping blocks 61b during welding.

The fixing block 61a has a pair of recesses to store a part of the third supporting arms 62 and 63. The gripping blocks 61b are attached to the fixing block 61a so as to grip the third supporting arms 62 and 63. These gripping blocks 61b are spaced and are not in contact with each other. This can make the third supporting arms 62 and 63 in a non-conductive state.

Each third supporting arm 62 (63) is made of a conductive material, such as a metal material listed in the above for the gripping block 61b, and includes an arm body 62a (63a) and a fixing member 62b (63b) attached to the arm body 62a (63a) at the distal end of the arm body 62a (63a) so as to clamp the fourth supporting arm 64 (65).

The fourth supporting arm 64 (65) is made of a conductive material, such as a metal material listed in the above for the gripping block 61b. The fourth supporting arm 64 (65) extends downward from the third supporting arm 62 (63) and has the electrode 66 (67) attached to the distal end. Each electrode 66, 67 of the present embodiment internally includes a coolant passage (not illustrated) to flow coolant water. Coolant water flowing through the coolant passage can cool the electrodes 66 and 67 during welding.

The pair of electrodes 66 and 67 are made of copper alloy, such as chromium copper (Cu—Cr), chromium-zirconium copper (Cu—Cr—Zr), beryllium copper (Cu—Be) or tungsten copper (Cu—W), and these electrodes are opposed to be spaced from each other. The pair of electrodes 66 and 67 disposed in such a state defines a space to store the pressurizing member 68, and the pressurizing member 68 is stored in the space. In the present embodiment, the pressurizing member 68 is clamped between the pair of electrodes 66 and 67. The pressurizing member 68 is made of a non-conductive material, such as ceramics or thermosetting resin. Current applied between the pair of electrodes 66 and 67 does not flow through such a pressurizing member 68.

The pressurizing member 68 of the present embodiment has such a configuration, and so moves up and down together with the pair of electrodes 66 and 67 as the elevator 7 moves up and down. The pair of electrodes 66 and 67 and the pressurizing member 68 in the present embodiment integrally move, and so pressurizing is performed at the same time with the pair of electrodes 66 and 67 and the pressurizing member 68. In another embodiment, the pressurizing member 68 may include another elevator different from the elevator 7 as stated above. This allows the pressurizing member 68 to move up and down at a different timing from the pair of electrodes 66 and 67, and the pressurizing member 68 may pressurize the first metal plate 11 with a welding force that does not depend on the contact pressure of the pair of electrodes 66 and 67 with the first metal plate 11 (e.g., with a welding pressure higher than that of the pair of electrodes 66 and 67).

The current supplying unit 8 supplies current between the pair of electrodes 66 and 67, and includes an electrical circuit 83 connecting to a power supply 84, a primary coil 81 connecting to the electrical circuit 83, and a secondary coil 82 to increase the current applied to the primary coil 81. The secondary coil 82 electrically connects to the pair of gripping blocks 61b and 61b. For welding, the controller 9 inputs a control signal to the electrical circuit 83, and current from the power supply 84 flows through the primary coil 81 to energize the primary coil 81. This generates a magnetic flux that flows through a core, so that current flows through the secondary coil 82. This allows current to flow through the pair of electrodes 66 and 67 while keeping the pair of electrodes 66 and 67 in contact with the first metal plate 11.

2. Method for Joining Dissimilar Metal Plates

Figure 3A:
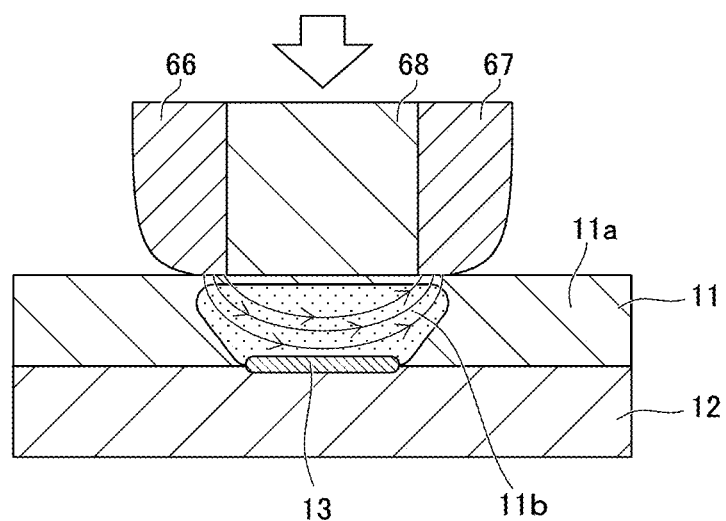
FIG. 3A is a schematic cross-sectional view to explain the melting state of a first metal plate by the joining method using the resistance-welding apparatus in FIG. 1.
Figure 3B:
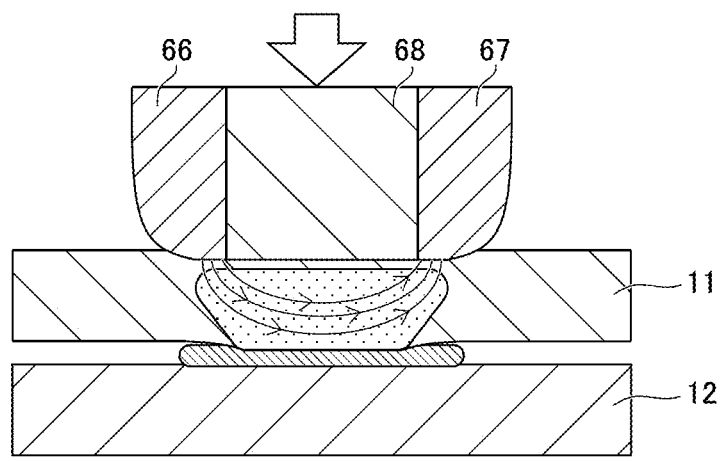
FIG. 3B is a schematic cross-sectional view to explain the state subsequent to FIG. 3A where an intermetallic compound, which is generated between the first metal plate and the second metal plate, is pushed out to the surrounding by pressurization.

Referring next to FIGS. 3A and 3B as well as FIGS. 1 and 2, the following describes a method for joining two dissimilar metal plates using the resistance-welding apparatus 1. FIG. 3A is a schematic cross-sectional view to explain the melting state of the first metal plate 11 by the joining method using the resistance-welding apparatus 1 in FIG. 1. FIG. 3B is a schematic cross-sectional view to explain the state subsequent to FIG. 3A where an intermetallic compound 13, which is generated between the first metal plate 11 and the second metal plate 12, is pushed out to the surrounding by pressurization.

2-1. Step of Preparing Dissimilar Metal Plates

The present embodiment firstly prepares a first metal plate 11 and a second metal plate 12 made of dissimilar metals that are different in volume resistivity as two dissimilar metal plates to be welded. The first metal plate 11 is made of a first metal and the second metal plate 12 is made of a second metal that is different from the first metal. The second metal has higher volume resistivity than that of the first metal plate. The second metal may have a higher melting point than that of the first metal. A metallic film, such as a plating film, may be formed between the first metal plate 11 and the second metal plate 12. The first metal plate 11 may have a thickness of 0.5 to 5.0 mm, and the second metal plate 12 may have a thickness of 0.5 to 5.0 mm.

In one example of the present embodiment, the first metal plate 11 is an aluminum plate or an aluminum alloy plate, and the first metal is aluminum or aluminum alloy. The second metal plate 12 is a steel plate, and the second metal is steel. At 20° C., for example, aluminum or aluminum alloy has volume resistivity of 2 to $6 \times 10^{-8}$ $\Omega \cdot m$ and steel has volume resistivity of 10 to $20 \times 10^{-8}$ $\Omega \cdot m$. In a temperature zone to melt aluminum or aluminum alloy as well, aluminum or aluminum alloy has volume resistivity lower than the volume resistivity of steel.

For favorable joining as described later, the volume resistivity of the second metal for the second metal plate is larger than the volume resistivity of the first metal for the first metal plate by $5 \times 10^{-8}$ $\Omega \cdot m$ or more at the melting point of the first metal of the first metal plate 11. This allows current to flow through the first metal plate 11 positively, and so enables favorable melting of the first metal plate 11. For example, the first metal plate is a magnesium plate and the second metal plate is a steel plate.

2-2. Contact Step

Next as shown in FIGS. 1 and 3A, for example, the first metal plate 11 and the second metal plate 12 are overlapped, and a pair of electrodes 66 and 67 is brought into contact with the surface of the overlapped portion 11a of the first metal plate 11 that is overlapped with the second metal plate.

Specifically as shown in FIG. 1, the second metal plate 12 and the first metal plate 11 are stacked in sequence on the mount base 54. This can dispose the first metal plate 11 at a position where the pair of electrodes 66 and 67 is opposed. In this state, the controller 9 inputs a control signal to control the pneumatic circuit 73 so as to supply actuating air to the cylinder 71 to lower the piston 72. Along with this, the welding unit 6 moves down, so that the pair of electrodes 66 and 67 pressurizes the overlapped portion IIa of the first metal plate 11 with a predetermined pressure. At the same time, the pressurizing member 68 disposed between the pair of electrodes 66 and 67 pressurizes the overlapped portion 11a of the first metal plate 11 with a predetermined pressure.

The present embodiment pressurizes the overlapped portion 11a of the first metal plate 11 with the pair of electrodes 66 and 67 and the pressurizing member 68. In another embodiment, the pressurizing member 68 only may pressurize the overlapped portion 11a of the first metal plate 11 with a predetermined pressure, and the pair of electrodes 66 and 67 may come in contact with the overlapped portion with a pressure lower than the predetermined pressure. Such a contact state may be implemented by disposing an elastic member, such as a spring, between the upper face of the pressurizing member 68 and the lower faces of the electrodes 66 and 67 that come in contact with the upper face of the pressurizing member. With this configuration, when the electrodes 66 and 67 move down until they come in contact with the overlapped portion 11a of the first metal plate 11, the pressurizing member 68 is biased toward the overlapped portion 11a of the first metal plate 11 due to compressive deformation of the elastic member. Such a biasing force can press the pressurizing member 68 against the overlapped portion 11a of the first metal plate 11.

2-3. Joining Step

The joining step applies current between the pair of electrodes 66 and 67, whereby the first metal present at a current-flowing region 11b of the overlapped portion 11a of the first metal plate 11 melts due to heat generated from the resistance. This creates an intermetallic compound 13 of the first metal and the second metal between the first metal plate 11 and the second metal plate 12, and joins the first and the second metal plates 11 and 12 via the intermetallic compound 13.

More specifically the controller 9 issues a control signal to control the electrical circuit 83 and apply current to the primary coil 81. This generates current at the secondary coil 82, so that current is applied to the pair of electrodes 66 and 67. In the present embodiment, such current is applied to the pair of electrodes 66 and 67 while pressurizing the first metal plate 11 against the second metal plate 12 with the pressurizing member 68 disposed between the pair of electrodes 66 and 67.

The first metal for the first metal plate 11 has volume resistivity lower than the volume resistivity of the second metal for the second metal plate 12, and so current applied hardly flows through a part between the first metal plate 11 and the second metal plate 12 and in the second metal plate 12. Instead, current flows through the current-flowing region 11b in the first metal plate 11 corresponding to a part between the electrodes 66 and 67. That is, current is applied between the electrodes 66 and 67 via the current-flowing region 11b of the first metal plate 11.

As a result, the first metal melts due to heat generated by resistance, and the heat due to melting diffuses the second metal at the surface layer of the second metal plate 12 in contact with the melting part into the first metal. This creates the intermetallic compound 13 of the first metal and the second metal between the first metal plate 11 and the second metal plate 12. As a result, this intermetallic compound 13 can serve as a joining member to join the first metal plate 11 and the second metal plate 12 as shown in FIG. 3A. In addition, impurities or the like at the surface of the second metal plate 12 are allowed to diffuse into a melting part of the melted first metal. Note here that the electrodes 66 and 67 are cooled by coolant water flowing through the inside during welding, and the electrodes 66 and 67 cool a surface layer of the first metal plate 11. The first metal plate 11 therefore melts from the inside.

The intermetallic compound 13 is brittler than the first metal and the second metal. The growth of the intermetallic compound of a few μm or more may degrade the strength of the joint part between the first metal plate 11 and the second metal plate 12. As stated above, the present embodiment is configured to apply current to the pair of electrodes 66 and 67 while pressurizing the first metal plate 11 against the second metal plate 12 with the pressurizing member 68 as shown in FIG. 3B. The pressurizing member 68 then can push out the redundant intermetallic compound 13 generated between the first metal plate 11 and the second metal plate 12 to the surrounding (outside of the pressurizing range). This can reduce the redundant intermetallic compound 13 at the joint part and can keep the thickness of the intermetallic compound 13 thin. The strength of the joint part therefore can improve.

EXAMPLES

The following describes examples of the present disclosure.

Example 1

A first metal plate and a second metal plate were joined by the resistance-welding apparatus of FIG. 1. Firstly 6000-family aluminum alloy of 1.0 mm in thickness was prepared for the first metal plate, and a galvanized steel plate of 0.7 mm in thickness was prepared for the second metal plate. Next these metal plates were overlapped, and a test piece including the first metal plate joined with the second metal plate was prepared by setting the welding pressure with the pair of electrodes and the pressurizing member at 5000 N, setting the current-applying time at 200 msec and setting the welding current at 13.0 kA as shown in Table 1.

Examples 2 to 16

Similarly to Example 1, test pieces of Examples 2 to 16 were prepared. These examples were different from Example 1 in the conditions during welding indicated in Table 1.

Comparative Examples 1 and 2

Similarly to Example 1, test pieces of Comparative Examples 1 and 2 were prepared. These examples were different from Example 1 in the conditions during welding indicated in Table 1.

(Test for Shear Strength)

For the test pieces of Examples 1 to 16 and Comparative Examples 1 and 2, the first metal plate of each test piece was held on one side and the second metal plate was held on the other side. Then load was applied in the direction of separating these metal plates. The strength of each test piece when the test piece was shear-fractured was the shear strength of the test piece. Table 1 shows the result. A fracture mode of the test piece after the shear fracture also was observed. Table 1 shows the result.

"Normal fracture" in Table 1 means a fracture such that the joint part of the first metal plate kept the joining with the second metal plate. A first plate of the normal fracture had a hole that was hollowed out at the joint part. This fracture means a favorable joint strength between the first metal plate and the second metal plate. "Interface break" is a fracture (break) from the interface between the first metal plate and the second metal plate, and this fracture means a faulty joint strength between the first metal plate and the second metal plate.

TABLE 1

|  | welding force (N) | current-applying time (msec) | welding current (kA) | shear strength (kN) | shear fracture mode |
|---|---|---|---|---|---|
| Ex. 1 | 5000 | 200 | 13.0 | 2.50 | normal fracture |
| Ex. 2 | 5000 | 200 | 14.0 | 2.59 | normal fracture |
| Ex. 3 | 5000 | 200 | 15.0 | 2.77 | normal fracture |
| Ex. 4 | 5000 | 200 | 16.0 | 2.92 | normal fracture |
| Ex. 5 | 5000 | 200 | 18.0 | 3.21 | normal fracture |
| Ex. 6 | 5000 | 200 | 20.0 | 3.45 | normal fracture |
| Ex. 7 | 5000 | 200 | 22.0 | 3.57 | normal fracture |
| Ex. 8 | 5000 | 200 | 24.0 | 2.90 | normal fracture |
| Ex. 9 | 5000 | 50 | 22.0 | 3.31 | normal fracture |
| Ex. 10 | 5000 | 50 | 24.0 | 3.29 | normal fracture |
| Ex. 11 | 5000 | 50 | 16.0 | 2.58 | normal fracture |
| Ex. 12 | 5000 | 100 | 16.0 | 2.98 | normal fracture |
| Ex. 13 | 5000 | 100 | 18.0 | 3.28 | normal fracture |
| Ex. 14 | 5000 | 100 | 20.0 | 3.50 | normal fracture |
| Ex. 15 | 5000 | 150 | 16.0 | 2.96 | normal fracture |
| Ex. 16 | 5000 | 150 | 18.0 | 3.16 | normal fracture |
| Comp. Ex. 1 | 5000 | 200 | 11.0 | 1.25 | interface break |
| Comp. Ex. 2 | 5000 | 200 | 12.0 | 1.59 | interface break |

(Microscopic Observation and Others)

Figure 4:
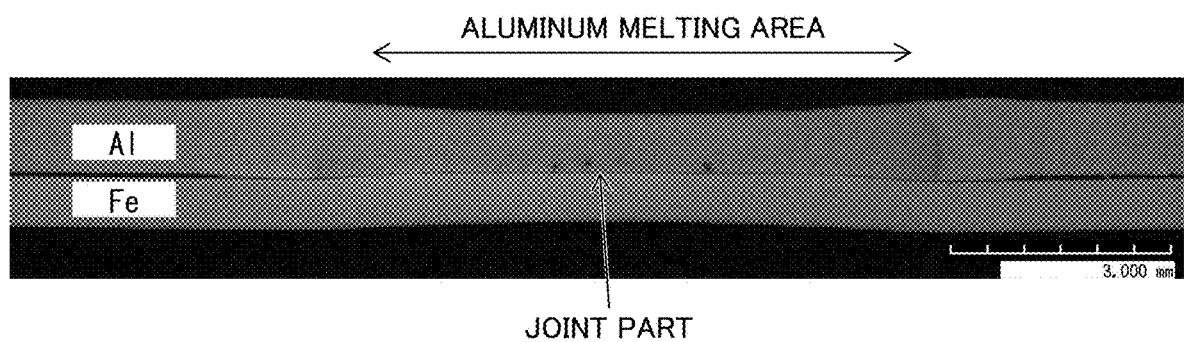
FIG. 4 is a photo of the test piece as Example 1 in cross section.
Figure 5A:
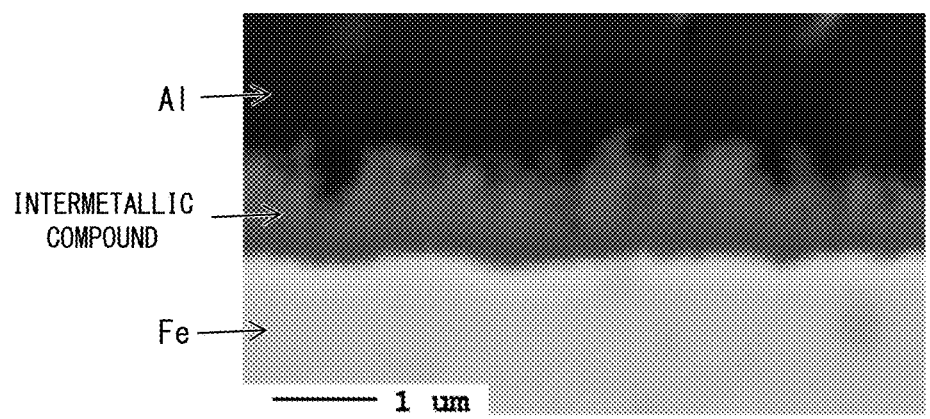
FIG. 5A is a photo of the test piece as Example 1 at the joint part in cross section that was observed with a scanning electron microscope (SEM)
Figure 5B:
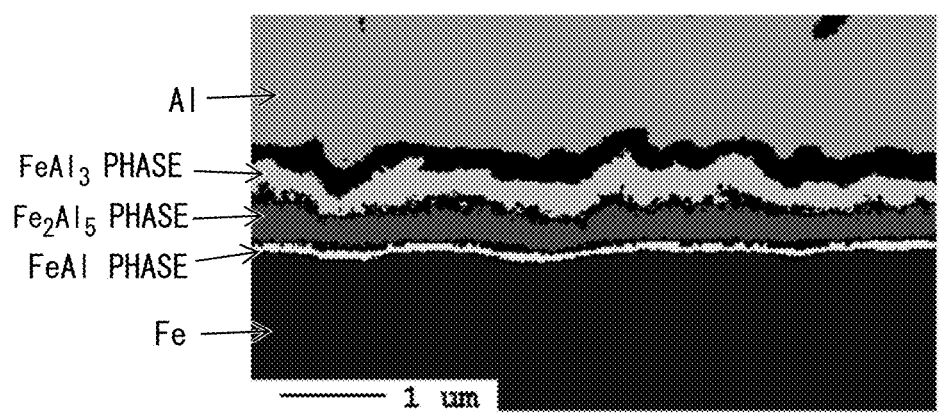
FIG. 5B is an image of the joint part in FIG. 5A that was analyzed with an electron probe microanalyzer (EPMA).

The test piece of Example 1 was cut in the thickness direction. The cross section was observed with a microscope, and was analyzed with an electron probe microanalyzer (EPMA). FIG. 4 is a photo of the test piece as Example 1 in cross section. FIG. 5A is a photo of the test piece as Example 1 at the joint part in cross section that was observed with a scanning electron microscope (SEM). FIG. 5B is an image of the joint part in FIG. 5A that was analyzed with an electron probe microanalyzer (EPMA).

As shown in Table 1, the test pieces of Examples 1 to 16 had the shear strength exceeding 2 kN, and the test pieces of Comparative Examples 1 and 2 had the shear strength falling below 2 kN. In this way, the shear strength of the test pieces of Examples 1 to 16 was larger than that of Comparative Examples 1 and 2. As shown in FIG. 4, aluminum alloy as the first metal plate in Example 1 melted during welding, but steel as the second metal did not melt. In addition, as shown in FIGS. 5A and 5B, an intermetallic compound of Fe—Al was formed between the first metal plate and the second metal plate.

Presumably these results show that aluminum alloy as the first metal plate melted during welding in Examples 1 to 16, and heat from the melting slightly diffused steel on the surface of the second metal plate, so that the intermetallic compound was formed between the first metal plate and the second metal plate. Presumably such an intermetallic compound improved the joint strength between the first metal plate and the second metal plate. On the other hand, although aluminum alloy as the first metal plate melted in Comparative Examples 1 and 2, the welding current was lower than in Examples 1 to 16, so that no intermetallic compound was formed between the first metal plate and the second metal plate. As a result, the test pieces of Comparative Examples 1 and 2 had the shear strength lower than that of Examples 1 to 16.

That is a detailed description of the embodiments of the present disclosure. The present disclosure is not limited to the above-stated embodiment, and the design may be modified variously without departing from the spirits of the present disclosure recited in the claims.

DESCRIPTION OF SYMBOLS

1 Resistance-welding apparatus
11 First metal plate
11a Overlapped portion
11b Current-flowing region
12 Second metal plate
13 Intermetallic compound
66, 67 Electrode
68 Pressurizing member

What is claimed is:

1. A method for joining two dissimilar metal plates, comprising the steps of:
   overlapping a first metal plate including a first metal and a second metal plate including a second metal as the dissimilar metal plates, the second metal having a volume resistivity higher than a volume resistivity of the first metal and being different from the first metal, and bringing a pair of electrodes into contact with a surface of an overlapped portion of the first metal plate that is overlapped with the second metal plate; and
   applying current between the pair of electrodes so as to melt the first metal present at a current-flowing region of the overlapped portion due to heat generated by resistance so as to form an intermetallic compound of the first metal and the second meta l between the first metal plate and the second metal plate and joining the first metal plate and the second metal plate via the intermetallic compound,
   wherein the current applied between the pair of electrodes results in only melting the first metal, and not the second metal,
   wherein at the step of bringing the pair of electrodes in contact, a pressurizing member including a non-conductive material is disposed between the pair of electrodes,
   wherein at the step of joining the first and the second metal plates, current is applied between the pair of electrodes while pressurizing the first metal plate against the second metal plate with the pressurizing member disposed between the pair of electrodes, and
   wherein during the step of joining the first and the second metal plates, the pressurizing member is pressurized against the first metal plate with a pressure higher than that of the pair of electrodes.

2. The method for joining dissimilar metal plates according to claim 1, wherein the first metal plate is an aluminum plate or an aluminum alloy plate and the second metal plate is a steel plate.

3. The method for joining dissimilar metal plates according to claim 1, wherein during the step of overlapping the first metal plate and the second metal plate, the pair of electrodes are brought into contact with only a surface of the overlapped portion of the first metal plate that is overlapped with the second metal plate.

4. The method for joining dissimilar metal plates according to claim 1, wherein the current applied between the pair of electrodes results in a larger amount of current being applied to the first metal plate as compared to the second metal plate.

5. The method for joining dissimilar metal plates according to claim 1, wherein the method further includes cooling the first metal plate and the second metal plate, after current is applied between the pair of electrodes, wherein at least initially, during the cooling, an inside portion of the first metal plate remains melted, but an outer surface of the first metal plate in contact with the pair of electrodes is not melted, and the pressurizing member pressurizes the first metal plate against the second metal plate.

\* \* \* \* \*